United States Patent
Kavalam et al.

[11] Patent Number: 6,057,836
[45] Date of Patent: May 2, 2000

[54] SYSTEM AND METHOD FOR RESIZING AND REARRANGING A COMPOSITE TOOLBAR BY DIRECT MANIPULATION

[75] Inventors: Jude Jacob Kavalam, Bellevue; Shawna Rae Sandeno, Issaquah; Jeffrey L. Bogdan, Redmond; Christopher R. Brown, Seattle, all of Wash.; Arthur E. Blume, New York, N.Y.

[73] Assignee: Microsoft Corporation, Redmond, Wash.

[21] Appl. No.: 08/840,444

[22] Filed: Apr. 1, 1997

[51] Int. Cl.[7] ........................................... G06F 5/01
[52] U.S. Cl. ............................. 345/334; 345/342
[58] Field of Search .................... 345/334, 342, 345/326–336, 338, 337, 339–341, 343–351, 352–354, 355–356, 135

[56] References Cited

U.S. PATENT DOCUMENTS

| | | | |
|---|---|---|---|
| 5,434,964 | 7/1995 | Moss et al. | 345/340 |
| 5,577,187 | 11/1996 | Mariani | 345/352 |
| 5,644,737 | 7/1997 | Tuniman et al. | 345/352 |
| 5,644,739 | 7/1997 | Moursund | 345/354 |
| 5,704,050 | 12/1997 | Redpath | 345/339 |

OTHER PUBLICATIONS

King, Adrain, "The Taskbar," *Inside Windows 95*, Text from Chapter 5 entitled "The User Interface and the Shell," pp. 179–181, Microsoft Press, Redmond, Washington, ©1994.

*Primary Examiner*—Steven P. Sax
*Attorney, Agent, or Firm*—Jones & Askew, LLP

[57] ABSTRACT

A system and method for customizing a composite toolbar via direct on-screen manipulation by resizing the composite toolbar and by rearranging sections within a composite toolbar. A composite toolbar is displayed in an initial configuration state having a resizing area and a plurality of sections displayed on a number n rows. When the resizing area has been dragged in a first direction, the size of the composite toolbar is increased by changing to a larger configuration state having n+1 rows. When the resizing area has been dragged in a second direction, the size of the composite toolbar is decreased by changing to a smaller configuration state having n−1 rows. In another aspect of the present invention, when the one of the sections has been dragged in a first direction, the dragged section is expanded so that it overlaps an adjacent section. When one of the sections has been dragged in a second direction, the dragged section is collapsed so that it reveals an adjacent section.

26 Claims, 13 Drawing Sheets

SYSTEM AND METHOD FOR RESIZING AND REARRANGING A COMPOSITE TOOLBAR BY DIRECT MANIPULATION

TECHNICAL FIELD

The present invention relates to a system and method for customizing toolbars, and is more particularly directed to a system and method for resizing a composite toolbar and rearranging sections within a composite toolbar by direct on-screen manipulation.

BACKGROUND OF THE INVENTION

Most modern computer software employs a graphical user interface to convey information to and receive commands from users. The graphical user interface relies on a variety of graphical user interface (GUI) elements or objects, including icons, text, drop-down menus, dialog boxes, toolbars, buttons, and the like. A user typically interacts with a graphical user interface by using a pointing device (e.g., a mouse) to position a pointer or cursor over an object and "clicking" on the object. An example of an operating system that provides a graphical user interface is the "WINDOWS 95" operating system, which is manufactured and sold by Microsoft Corporation of Redmond, Wash.

In a system that employs a graphical user interface, toolbars are common GUI elements that provide an effective way to display numerous computer commands. Toolbars are GUI elements associated with an application window, which is a window for a particular application program in which primary viewing and/or editing interaction occurs. Toolbars provide access to a set of commands that are usually represented by buttons, menu buttons, comboboxes, and other UI controls. A user can invoke any command in the toolbar by clicking on the associated button or UI control. Toolbars typically present groups of command buttons in rows or columns, which can be oriented horizontally or vertically. Although most toolbars are visually attached to an application window, some may float above, below, or to the side of an application window. The primary advantage of toolbars is that they present a set of buttons or commands that are only one click away while the user is using the associated program.

In most programs that employ toolbars, the toolbars can be modified by adding or deleting buttons, or by changing the function associated with a button. This allows the user to customize a toolbar so that the toolbar provides convenient access to the commands that are most frequently used by the user. In addition, these programs support multiple toolbars that can be turned on and off, thereby providing the user with the option of viewing two or more toolbars simultaneously. In some prior art systems, the process of customizing or manipulating toolbars requires use of a dialog box. The dialog box displays a list of commands that are available for the toolbar. The dialog box can also display a list of available toolbars that can be displayed in the application window. The user can then customize the display area of the display screen by selecting which toolbars the user wants displayed.

Generally, these programs are designed to treat each toolbar as separate entities, and therefore, each toolbar has to be manipulated separately. Also, these systems do not allow sections within a toolbar to overlap. If the user elects to view multiple toolbars simultaneously, a large amount of display screen real-estate can easily be taken up by toolbars. The more toolbars displayed on the display screen, the less available workspace the user is provided.

In prior art systems, a predefined area is typically designated for the occupation of toolbars. These toolbars can be directly manipulated within this designated area—i.e., the user can move each toolbar to various locations within the designated area. However, when the toolbars are moved to various locations within the designated area, there is no mechanism for automatically filling in gaps between toolbars. Moreover, minimal changes occur in the amount of space the toolbars, as a whole, occupy to provide more usable workspace for the user.

Consequently, the user has to manipulate many of the displayed toolbars, one by one, to fill in gaps between toolbars. The user also has to manipulate the toolbars separately to reduce the number of rows that the toolbars occupy on the display screen. Furthermore, the user may have to turn off some toolbars to provide more workspace. As a result, the user only has direct access to the toolbars that are displayed on the display screen, while the toolbars that are turned off can only be accessed via dialog box or menu bar.

The user's task of achieving the optimum amount of workspace can become very cumbersome. Not only does the user have to decide which toolbars to display and manipulate each toolbar separately to optimize space, but the user must also consider the fact that each toolbar can vary in size and shape. The process is inefficient and can be very time-consuming.

The prior art does not provide any convenient way to alter multiple toolbars by directly interacting with the toolbars as a unit. Prior art methods require the user to either employ a separate dialog box or manipulate the toolbars one at a time to determine the amount of space that multiple toolbars occupy on the display screen.

Therefore, there is a need for a method that supports direct manipulation of toolbars on a computer display screen. In addition, there is a need for a method that allows a user to easily resize toolbars and rearrange sections within the toolbars. There is also a need for a method that is capable of operating multiple toolbars simultaneously. Finally, there is a need for a method that utilizes sliding and overlapping features as a mechanism for customizing toolbars.

SUMMARY OF THE INVENTION

The present invention satisfies the above-described needs by providing a system and method for resizing a composite toolbar. Generally described, a composite toolbar is displayed in an initial configuration state. The composite toolbar has a resizing area and a plurality of sections displayed on a number n rows. When an indication is received from the input device that the resizing area has been moved in a specific direction, the size of the composite toolbar is altered by changing to a next configuration state having a number y rows, where number y is not equal to number x.

More particularly described, in the next configuration state, the plurality of sections are arranged on the y rows, where $y=x+1$ or $y=x-1$, thereby effectively increasing or decreasing, respectively, the size of the composite toolbar. One of the plurality of sections is a stationary section that is displayed in a predetermined position on one of the rows regardless of the number of rows in the configuration state.

Another aspect of the present invention provides a system and method for rearranging a composite toolbar. In connection with this aspect of the present invention, a composite toolbar is displayed in an initial configuration state having a plurality of sections displayed on a number n rows. In response to an indication that one of the sections has been moved in a first direction, the moved section is expanded so that it overlaps an adjacent section. When an indication is received from the input device that one of the sections has been moved in a second direction, the moved section is collapsed so that it reveals an adjacent section.

More particularly described with respect to this aspect of the present invention, when an indication is received from the input device that one of the sections has been moved in a third direction, the section is moved to a new row and displayed in an expanded state. When an indication is received from the input device that one of the sections has been moved in a fourth direction, the section is moved to an existing adjacent row and displayed in an expanded state, and the section previously on the existing adjacent row is displayed in a compressed state.

In addition, in response to moving the section to an existing adjacent row, a determination is made as to whether one of the n rows is empty, and in response to one of the n rows being empty, the empty row is deleted. Deleting the empty row results in the composite toolbar having n−1 rows, and the plurality of sections are arranged on the n−1 rows. Moving a section to a new row results in the composite toolbar having n+1 rows, and the plurality of sections are arranged on the n+1 rows.

Yet another aspect of the present invention provides in a computer system including a display device and an input device and employing a graphical user interface (GUI), a method for rearranging a composite toolbar. In connection with this aspect of the present invention, a composite toolbar is displayed in an initial configuration state, wherein the composite toolbar has a rearranging area and a plurality of sections displayed on a number n rows. When an indication is received from the input device that the rearranging area has been moved in a first direction, the size of the composite toolbar is increased by changing to a larger configuration state having n+1 rows. When an indication is received from the input device that the rearranging area has been moved in the second direction, the size of the composite toolbar is decreased by changing to a smaller configuration state having n−1 rows.

When an indication is received from the input device that one of the sections has been moved in a first direction, the section is moved to a new row and displayed it in an expanded state. When an indication is received from the input device that one of the sections has been moved in a second direction, the section is moved to an existing adjacent row and displayed in an expanded state, and the section previously on the existing adjacent row is displayed in a compressed state. When an indication is received from the input device that a section has been moved in a third direction, the moved section is expanded so that it overlaps an adjacent section. When an indication is received from the input device that one of the sections has been moved in a fourth direction, the moved section is collapsed so that it reveals an adjacent section.

In response to moving the section to an existing adjacent row, a determination is made as to whether one of the n rows is empty. In response to one of the n rows being empty, the empty row is deleted. Deleting the empty row results in the composite toolbar having n−1 rows, and the plurality of sections are arranged on the n−1 rows. Moving a section to a new row results in the composite toolbar having n+1 rows, and the plurality of sections are arranged on the n+1 rows.

When an indication is received that one of the sections has been moved in the third or fourth direction past an adjacent section, the moved section is repositioned so that it is positioned to the opposite side of the adjacent section.

In view of the foregoing, the present invention provides a system and method that support direct manipulation of a composite toolbar on a computer display screen. In addition, the present invention provides a system and method that allow a user to easily resize the composite toolbar and rearrange section within the composite toolbar. The present invention also provides a system and method that is capable of operating multiple toolbars simultaneously. Finally, the present invention provides a method and system that utilizes sliding and overlapping features as a mechanism for customizing the composite toolbar.

These and other objects, features, and advantages of the present invention may be more clearly understood and appreciated from a review of the following detailed description of the disclosed embodiments and by reference to the appended drawings and claims.

DETAILED DESCRIPTION

The present invention is directed to a system and method for customizing a composite toolbar by direct on-screen manipulation. In an exemplary embodiment, the invention is incorporated into the "INTERNET EXPLORER" web browser program, which is produced and distributed by Microsoft Corporation of Redmond, Wash. Briefly described, the "INTERNET EXPLORER" web browser program allows the user to access information available on the World Wide Web. The "INTERNET EXPLORER" web browser program provides a composite toolbar that can be directly altered within an application window by utilizing overlapping and sliding features. The composite toolbar includes multiple sections, which may be displayed in one or more rows. The customization features, specifically the resizability and rearrangement features, will be described in greater detail herein below with respect to FIGS. 1–13, wherein like elements are represented by like numerals throughout the several figures.

Figure 1:
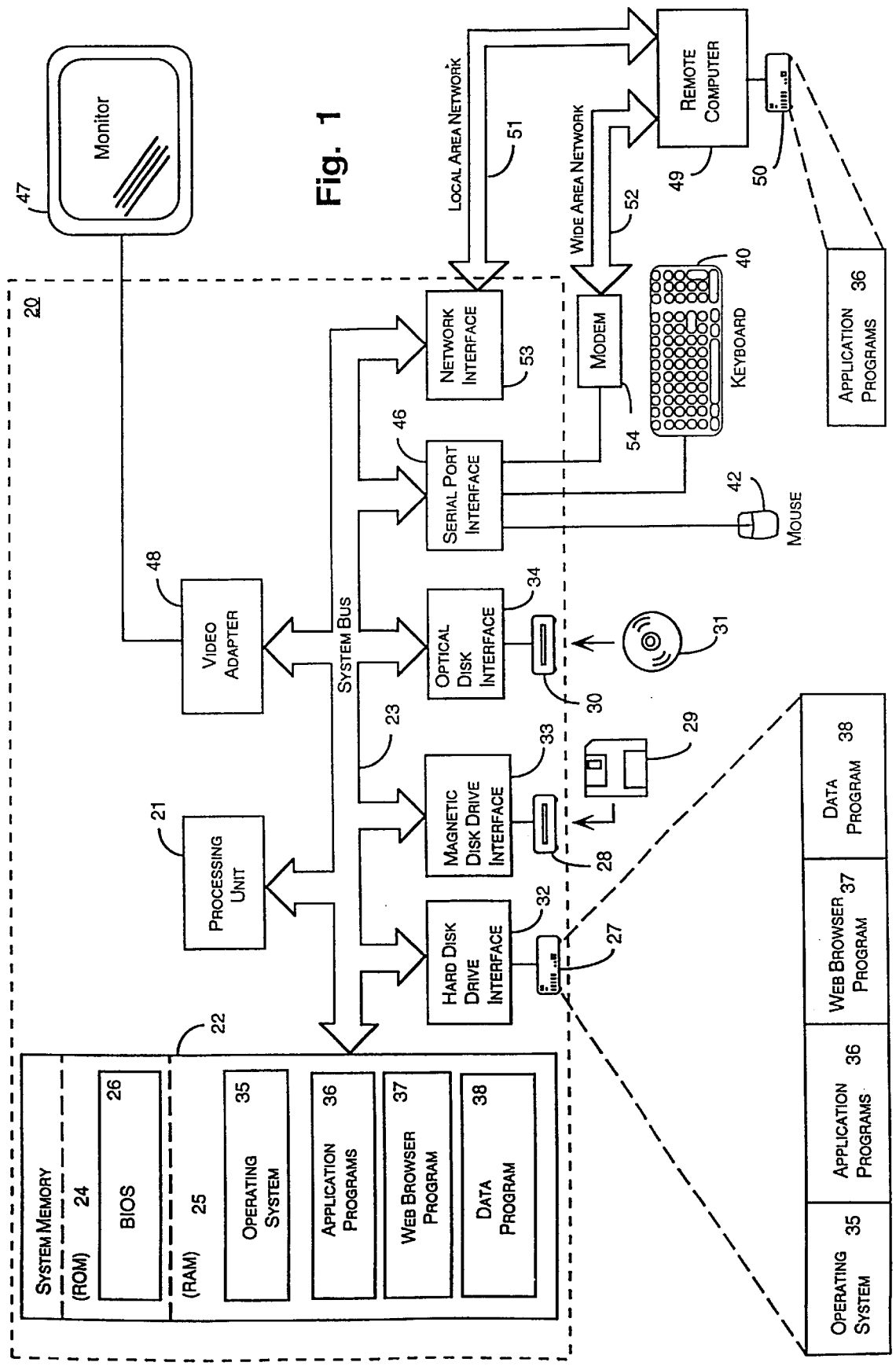
FIG. 1 is a block diagram of a personal computer that provides an exemplary operating environment for the exemplary embodiment of the present invention.

Now turning to FIG. 1, an exemplary operating environment in accordance with the exemplary embodiment of the present invention is now described.

EXEMPLARY OPERATING ENVIRONMENT

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a web browser application program 37, and program data 38. A user may enter commands and information into the personal computer 20 through a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

CUSTOMIZATION OF COMPOSITE TOOLBAR

An exemplary method for altering a composite toolbar by direct manipulation is illustrated in FIGS. 2–13.

FIGS. 2–10 illustrate screen displays that depict a process by which a user can alter a composite toolbar by direct manipulation. The composite toolbar includes a plurality of sections. The composite toolbar can be altered by resizing the toolbar or rearranging the sections, or both.

Figure 2:
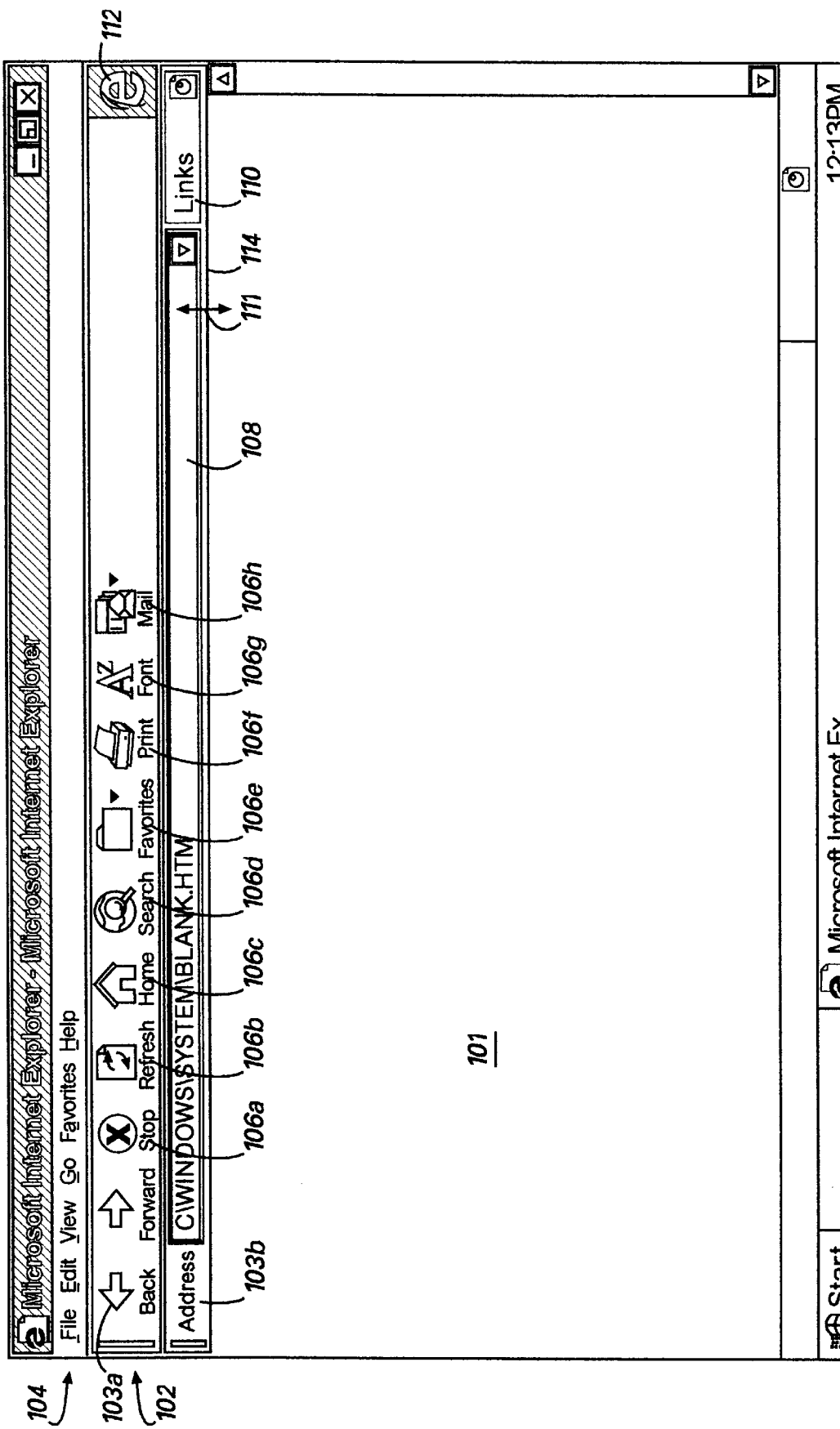
FIG. 2 is a screen display illustrating an initial application window in accordance with the exemplary embodiment of the present invention.

FIG. 2 depicts an initial application window 100 that is displayed on the monitor 47 (FIG. 1) by the "INTERNET EXPLORER" application program 37 (FIG. 1). The application window 100 includes a drop down menu bar 104 and a composite toolbar 102. Those skilled in the art will understand that the menu bar 104 displays the names of several drop down menus. When selected, each drop down menu displays a list of available commands (not shown).

Because the present invention focuses on one aspect of the exemplary application program, toolbar customization, namely the resizability and rearrangement features, primary focus will be placed on the composite toolbar 102, which is located at that the top of the application window 100. The composite toolbar 102, as shown in FIG. 2, represents a standard default or medium configuration state that is displayed when the exemplary application program is initialized.

The composite toolbar 102 includes four sections, including a standard toolbar 120, a links bar 110, an address bar 108, and a logo section 112. In its default configuration state, the composite toolbar 102 consists of two rows 103a and 103b, which are used to display the four sections. Row 103a contains the standard toolbar 120 and the logo section 112. The buttons 106a–h on the standard toolbar 120 are used to perform web browsing functions, such as changing from one Web page to another Web page, printing, accessing e-mail, and searching the Web.

Row 103b contains the address bar 108 and the links bar 110. The address bar 108 displays the uniform resource locator (URL), or address, of the Web page that is currently being viewed. The user may also point the browser to a new URL by typing it in the address bar. The links bar 110 includes a plurality of buttons that are associated with URLs. The user may go directly to one of those URLs by clicking on the appropriate button. It will be understood by one skilled in the art that the logo section or area 112 is not limited to use of logos, but may also be used for displaying any information suitable for display in the toolbar area. It will also be understood by one skilled in the art that the present invention is not limited to a composite toolbar containing the specific sections mentioned above and that this combination of sections only represents an example of a number of combinations and sections that can be used within the composite toolbar.

After the initial application window 100 is displayed, the user may want to customize the composite toolbar 102 by changing the amount of space that the composite toolbar 102 occupies in the display area 101 or by rearranging sections within the composite toolbar 102.

The user may resize the composite toolbar 102 by direct on-screen manipulation using the mouse 42 (FIG. 1). The user effectively resizes the composite toolbar 102 by changing from one configuration state of the composite toolbar 102 to one of several other configuration states. In an exemplary embodiment, the composite toolbar 102 has four configuration states, denominated a smallest state, a small state, a medium state, and a large state. Each configuration state will be described in greater detail in conjunction with FIGS. 3(a)–3(d).

If the user desires to compress or expand the composite toolbar to display one of the configuration states, the user can use the mouse 42 to move the cursor over the bottom edge 114 of the composite toolbar 102. Once the cursor is in the appropriate position for altering the composite toolbar 102, the appearance of the cursor changes to a vertical double-headed arrow 111. When the vertical double-headed arrow 111 appears, the user has the option of dragging the bottom edge 114 of the composite toolbar 102 upward or downward. As the composite toolbar 102 is dragged upward or downward, the user is able to view each configuration state (depending on the direction the user drags the composite toolbar 102) in the application window 100. Once the user decides which one of the configuration states is preferred, the user may release the mouse button so that the preferred configuration state becomes active.

FIGS. 3(a)–3(d) illustrate a composite toolbar in the configuration states provided by an exemplary embodiment of the present invention.

FIG. 3(a) illustrates the composite toolbar 102 in a smallest configuration state. The smallest configuration state consists of one row 130. Row 130 contains four sections, including the standard toolbar 120, the address bar 108, the links bar 110, and the logo area 112. The address bar 108 and the links bar 110 are displayed in a collapsed state. This configuration state uses the least display screen real-estate.

FIG. 3(b) illustrates the composite toolbar 102 in a small configuration state. The small configuration state also consists of one row 115, which contains the standard toolbar 120, the address bar 108, the links bar 110, and the logo area 112. However, the difference between the small and smallest configuration states is the composite toolbar 102 is larger in the small configuration state because the text captions within the standard toolbar 120 are now visible.

FIG. 3(c) illustrates the composite toolbar 102 in a medium configuration state. This medium configuration state was previously described in conjunction with FIG. 2. To reiterate, the medium configuration state consists of two rows 103a and 103b. Row 103a contains the standard toolbar 120 and the logo area 112. Row 103b contains the address bar 108 and the links bar 110.

FIG. 3(d) illustrates the composite toolbar 102 in a large configuration state. The large configuration state consists of three rows 140a, 140b, and 140c. In this configuration state, the standard toolbar 120 and the logo area 112 are located on row 140a. The address bar 108 is located on row 140b. The links bar 110 is located on row 140c. The standard toolbar 120 includes captions beneath each button. Also, the address bar 108 and the links bar 110 are fully expanded. In this configuration state, the composite toolbar 102 occupies more display screen real-estate than any other configuration state. In addition, any time the user desires to view every section in its fully expanded view, the user can resize the composite toolbar 102 to the large configuration state.

It will be appreciated by those skilled in the art that the present invention is not limited to the specific configuration states or sections described above, but may be expanded to include additional sections or configuration states containing more rows. In addition, the addition or removal of text captions need not be limited to the standard toolbar, but may be expanded to include any toolbar that would benefit from text captions in association with buttons, icons, and the like.

With respect to the resizing aspect of the customization feature, the composite toolbar can be resized by direct on-screen manipulation according to the user's preference. The user simply drags the bottom edge of the composite toolbar either upward or downward based upon the user's desire to see more or less of the composite toolbar. One advantage of being able to manipulate the size of the composite toolbar is the user's ability to determine which format best serves the user's purpose based on the user's skill level. While a more advanced user may desire to conserve display screen real-estate by decreasing the size of the composite toolbar, a novice user may need to see more information with respect to the sections within the composite toolbar by expanding it. Because the size of the composite toolbar is easily adjusted, a user may reduce the size of the composite toolbar when viewing a large image or document, and easily increase the size of the composite toolbar to provide additional commands while navigating various Web pages.

Now turning back to FIG. 3(b), the rearrangement of sections within the composite toolbar will be described. This aspect of the customization feature allows the user to rearrange sections within the composite toolbar—that is, move sections to different rows and swap sections within the same row. In addition, a section may be expanded to partially cover another section.

In FIG. 3(b), if the user desires to move the links bar 110, for example, to the far left side of the row so that the links bar 110 is positioned on the immediate left of the standard toolbar 120, the user simply moves the cursor to a double-lined raised edge 148 located to the immediate left of the links bar 110 or the user may move the cursor directly over a caption "links" of the links bar 110. The double-lined raised edge and section caption are recognized as a single component called a header. Once the cursor is positioned over the header, the cursor changes appearance. In this example, a horizontal double-headed arrow 150 appears over the double-lined raised edge 148 or a hand (not shown) appears over the links bar 110. It will be understood by those skilled in the art that the cursor may change to any suitable form to indicate that the cursor is positioned in an appropriate position to rearrange a section. Further, it will be appreciated by those skilled in the art that the present invention is not limited to the appearance of the cursor changing form to indicate that the cursor is in the appropriate position, but may instead provide a message indicating same. Next, the user drags the links bar 110 to the far left edge of the composite toolbar 102. After doing so, the user can release the mouse button to permanently position the links bar 110 on the immediate left of the standard toolbar 120, as shown in FIG. 4.

Figure 4:
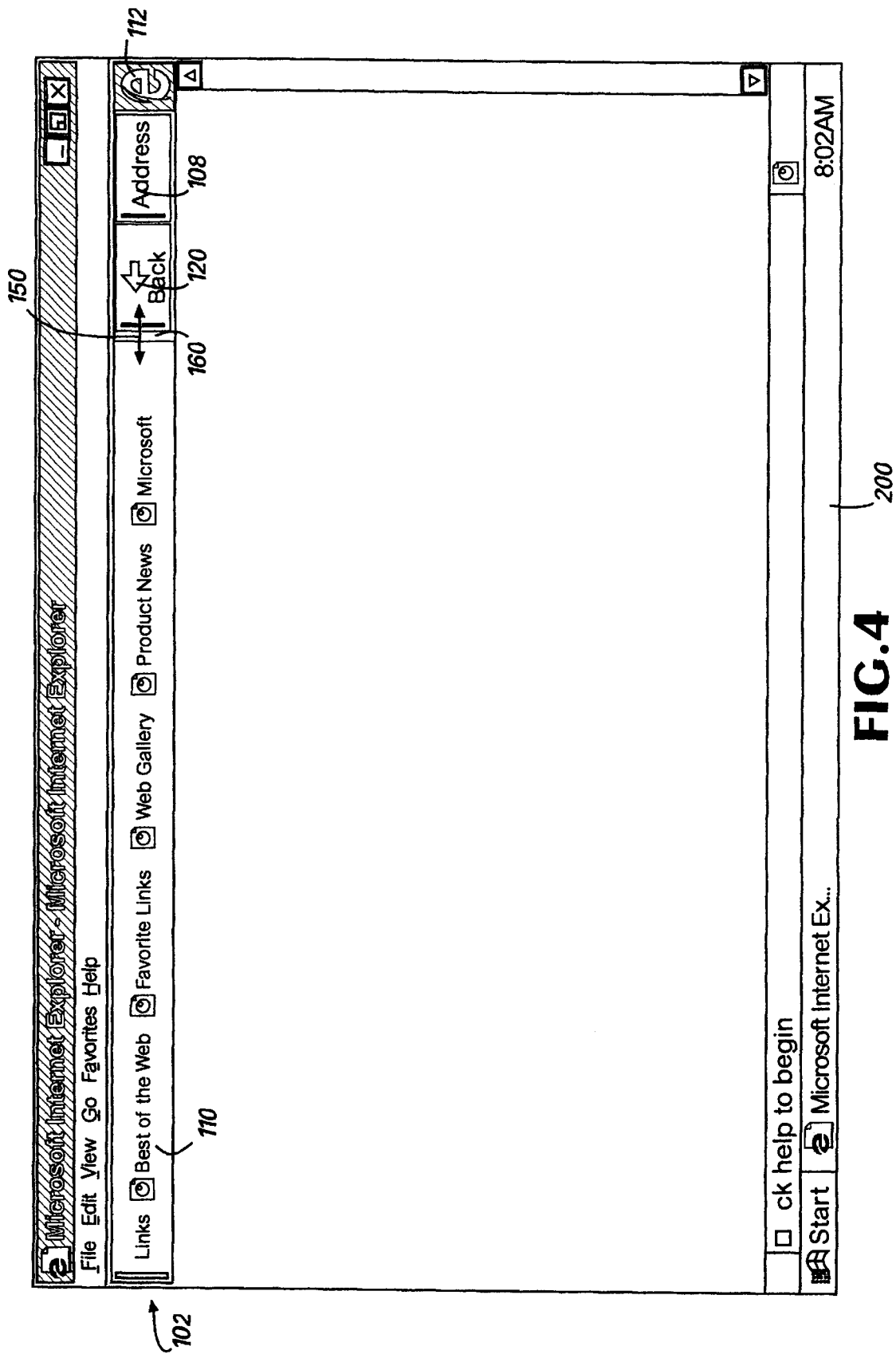
FIG. 4 is a screen display depicting rearrangement of a links bar within a composite toolbar in accordance with the exemplary embodiment of the present invention.

Now turning to FIG. 4, a screen display depicting rearrangement of a links bar within a composite toolbar is shown. After releasing the mouse button, the links bar 110 appears on the immediate left of the standard toolbar 120 in an expanded view. The standard toolbar 120 is collapsed. The collapsed address bar 108 is still positioned to the immediate right of the standard toolbar 120, and the logo area 112 remains located at the far right top corner within the composite toolbar 102. In essence, the links bar 110 first moves past the address bar 108, and then moves past the standard toolbar 120 so that the links bar 110 is positioned to the far left side of the row. This specific maneuvering of the links bar 110 occurs so quickly that it is almost visually undetectable.

Although most sections of the composite toolbar 102 can be rearranged by direct manipulation, the logo area 112 cannot. It is the only section that cannot be rearranged and remains positioned on the far right top corner of the composite toolbar 102. All other sections are movable. The computer-implemented process of the present invention is designed so that any customization of the composite toolbar 102 can be implemented without disturbing the position of the logo area 112. To that end, the rearrangement of sections within the composite toolbar 102 and the resizability of the composite toolbar 102 operate around the logo area 112. It will be appreciated by those skilled in the art that the present invention is not limited to the fixation of the logo area 112 in the right top corner of the composite toolbar 102, but may also include an option for affixing the logo area 112, or any other section of the composite toolbar, in any of the corners of the composite toolbar 102.

If the user desires to view the standard toolbar 120 in an expanded view so that the buttons are visible, the user can do so using one of three methods. Referring to FIG. 4, one method allows the user to drag or slide the standard toolbar 120 to the left to expand or uncover the standard toolbar 120 in the application window 200. First, the user moves the cursor over the header 160 of the standard toolbar 120. When the cursor is in the appropriate position, the appearance of the cursor changes to the horizontal double-headed arrow 150. The user then drags or slides the standard toolbar 120 to the left.

Figure 5:
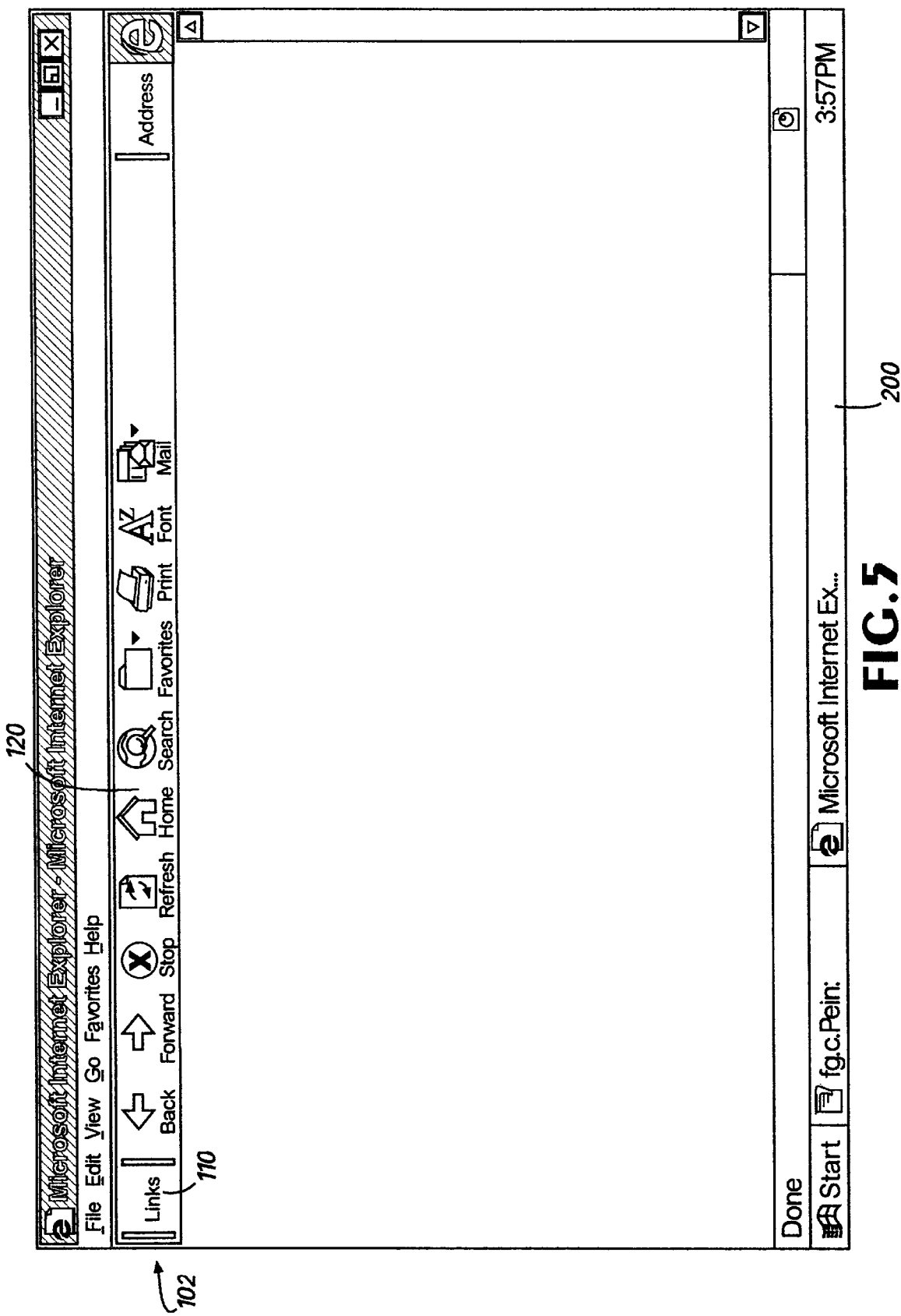
FIG. 5 is a screen display illustrating a composite toolbar wherein a standard toolbar is fully expanded and a links bar is shown in a collapsed view in accordance with the exemplary embodiment of the present invention.

As the user drags the standard toolbar 120 to the left, the links bar 110 begins to collapse, and the standard toolbar 120 begins to expand. When the standard toolbar 120 has been fully expanded, the links bar 110 changes to a collapsed view. This configuration is illustrated in FIG. 5.

The user may release the mouse button at any time during the dragging process to show a fully expanded or partially expanded standard toolbar 120 and a collapsed or partially expanded links bar 110. Each section within the composite toolbar 102 is able to slide back and forth to reveal or conceal each section due to the overlapping nature of the sections. For example, with respect to FIG. 5, the standard toolbar 120 overlaps the links bar 110. When the user slides the standard toolbar 120 to the right, standard toolbar 120 not only reveals the links bar 110 that was hidden behind the standard toolbar 120, but the standard toolbar 120 also slides behind the address bar 108, as illustrated in FIG. 4.

It will be appreciated by those skilled in the art that, due to the overlapping nature of adjacent sections, multiple sections may move simultaneously when a section is being expanded or collapsed. For example, in FIG. 4, if the user drags the address bar 108 to the left to expand it, the collapsed standard toolbar 120 will also slide to the left because it is stacked next to, or overlapped by, the address bar 108.

Another method for viewing a collapsed section allows the user to click directly on the section to reveal it. This method applies to any section that is hidden behind another section and may be used to reveal the selected section. For example, turning back to FIG. 4, if the user desires to view the standard toolbar 120 in an expanded view without using the sliding feature that was previously described, the user can simply move the cursor over the header 160 of the standard toolbar 120 and click on the header 160. The standard toolbar 120 will appear in a fully expanded view, and the links bar 110 will appear in a collapsed view, as shown in FIG. 5, thereby producing the same result as the previously described sliding method.

Figure 6:
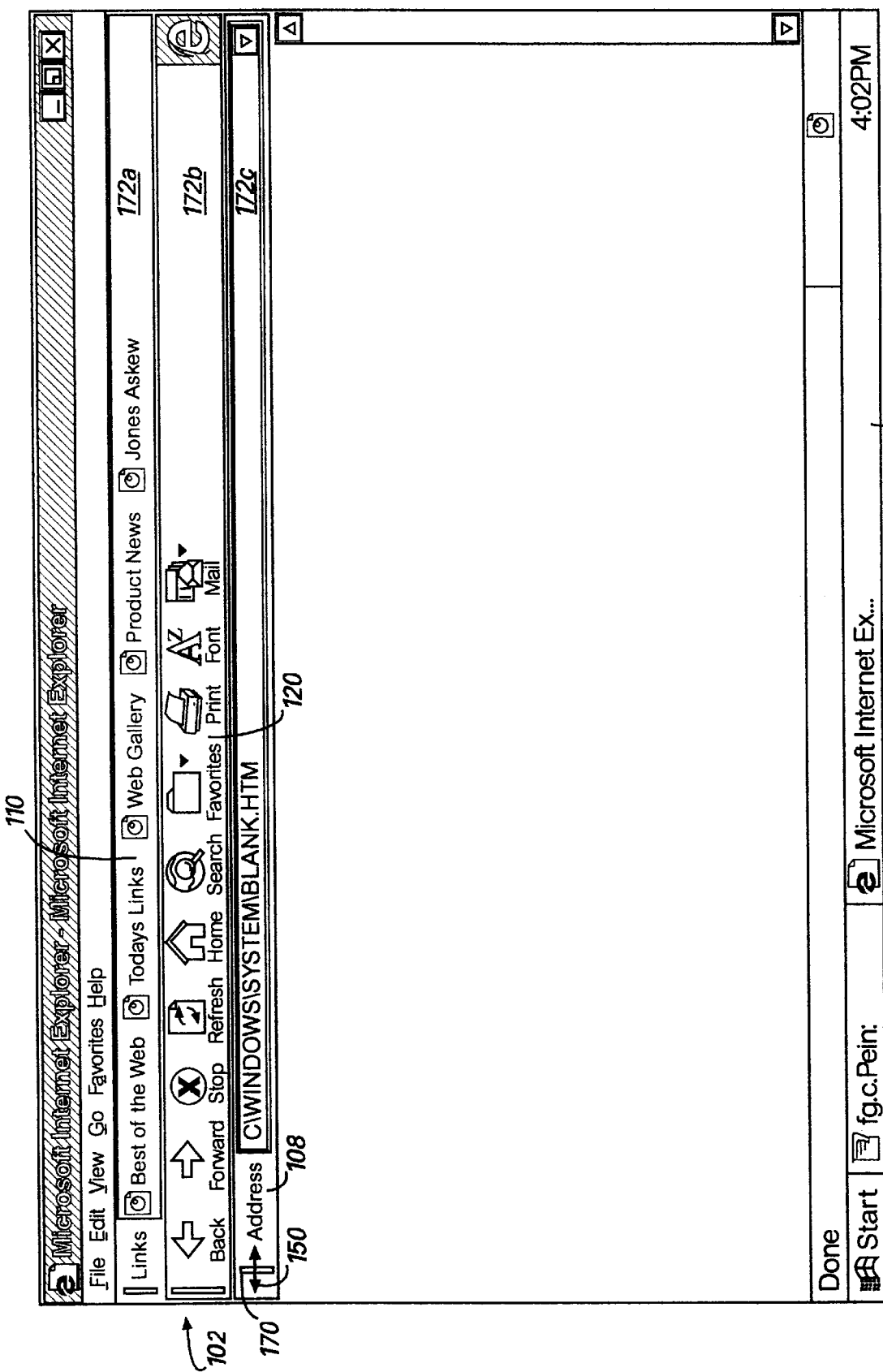
FIG. 6 is a screen display illustrating a composite toolbar in a large configuration state in accordance with the exemplary embodiment of the present invention.

A third method for fully expanding sections is by resizing the composite toolbar 102 to the large configuration state, as previously mentioned with respect to the resizing feature. The user simply follows the same procedure as described above with respect to FIGS. 2–3(d), which describe the resizing aspect of the present invention. FIG. 6 is a screen display illustrating the fully expanded view of all sections when the composite toolbar is in a large configuration state.

Upon comparing FIG. 6 with FIG. 3(d), it is apparent that the sections are rearranged. In the first row, the links bar 110 has replaced the standard toolbar 120. The standard toolbar 120 has replaced the address bar 108 in the second row. The address bar 108 has replaced the links bar 110 in the third row.

Referring to FIG. 6, in another example, the user may desire to change the location of the address bar 108, which is currently located on row 172c, such that it appears to the immediate left of the standard toolbar 120, which is located on row 172b. The user simply moves the cursor over the header 170 of the address bar 108. Once the cursor is in the appropriate position for altering the section within the composite toolbar 102, the appearance of the cursor changes either to the horizontal double-headed arrow 150, as described in conjunction with FIG. 4, or to a hand (not shown), as previously mentioned in conjunction with FIG. 3(b).

When the horizontal double-headed arrow 150 appears in the application window 200, the user drags the address bar 108 upward to the immediate left of the standard toolbar 120 on row 172*b*. The user then releases the mouse button so that the address bar 108 is properly positioned on row 172*b* to the left of the standard toolbar 120, as shown in FIG. 7.

Figure 7:
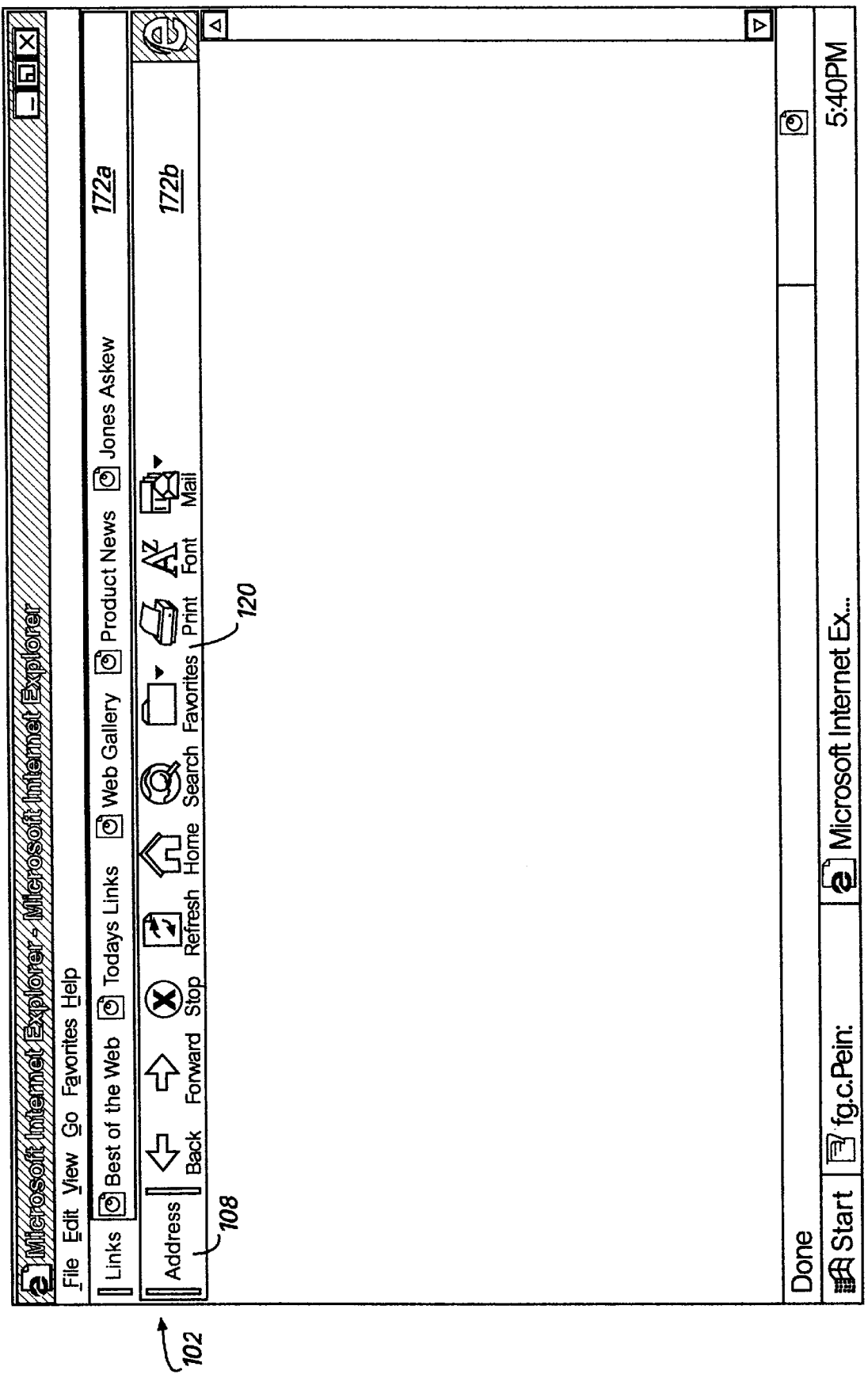
FIG. 7 is a screen display illustrating a composite toolbar after an address bar has been rearranged in accordance with the exemplary embodiment of the present invention.

FIG. 7 is a screen display illustrating a composite toolbar after an address bar 108 has been rearranged by dragging the address bar from the third row to the second row. In FIG. 7, the composite toolbar 102 now consists of two rows 172*a* and 172*b*, instead of three rows as shown in FIG. 6. Because there are no sections remaining on row 172*c* when the address bar 108 is moved to row 172*b*, row 172*c* is no longer needed. The address bar 108 is positioned in a collapsed view on row 172*b* to the immediate left of the standard toolbar 120. The composite toolbar 102 is consolidated into two rows, thereby providing more usable display screen real-estate. The composite toolbar 102 automatically reduces its size when there are no sections remaining on a row. Hence, resizing may automatically follow rearranging.

Figure 8:
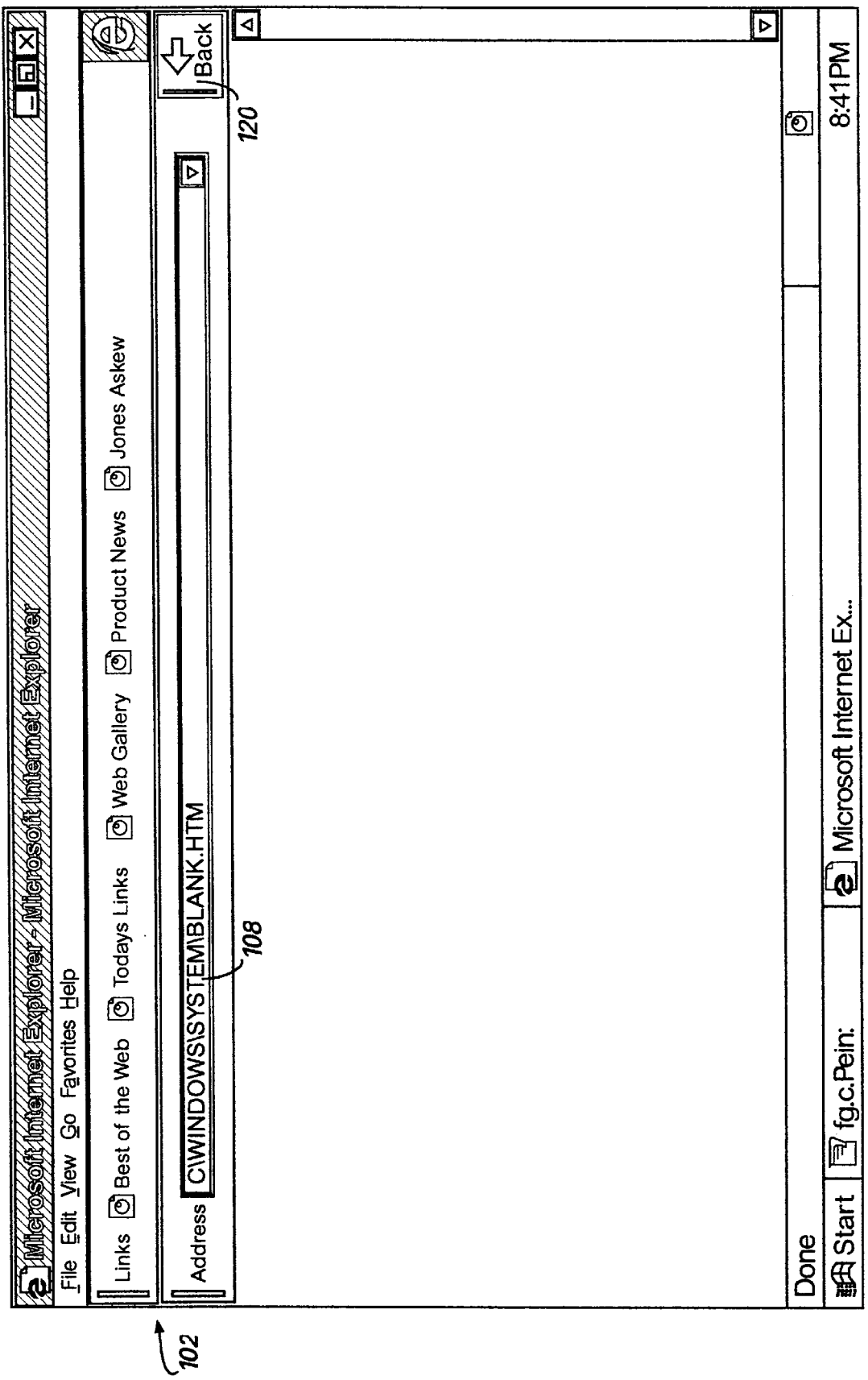
FIG. 8 is a screen display illustrating an address bar in full view within a composite toolbar in accordance with the exemplary embodiment of the present invention.

At this point, if the user desires to see the address bar 108 in a fully expanded view, the user may either click on the address bar 108 or drag the standard toolbar 120 to the right following the process previously described with respect to FIGS. 4 and 5. Using either method, the address bar 108 comes into full view and the standard toolbar 120 collapses, as shown in FIG. 8.

The user may desire to see multiple sections simultaneously and without the need for occupying more display screen real-estate. The user can accomplish this task by arranging sections so that multiple sections are partially expanded on the same row. Due to the overlapping and sliding features used in customizing the composite toolbar 102, the user can slide any section horizontally to see more or less of the section.

Figure 9:
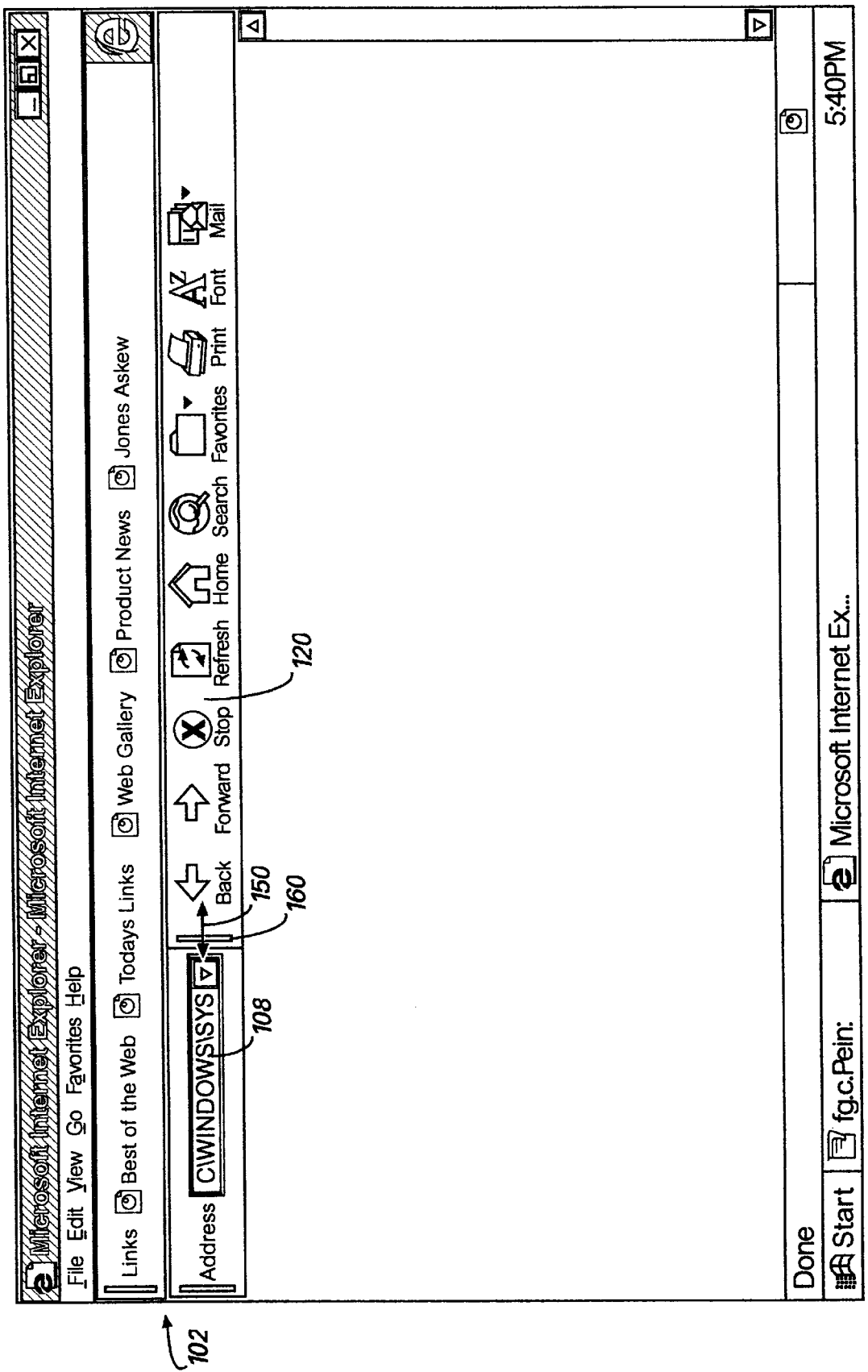
FIG. 9 is a screen display illustrating partial expansion of a section in accordance with the exemplary embodiment of the present invention.

For example, referring to FIG. 9, a screen display illustrating partial expansion of a section will be described in greater detail in accordance with the exemplary embodiment of the present invention. The user, in this example, wants to see portions of both the standard toolbar 120 and the address bar 108 on the same row. The user clicks on the header 160. When the horizontal double-headed arrow 150 appears, the user begins dragging the standard toolbar 120 to the right.

When the user decides to release the mouse button, the selected section will remain in its current position. In other words, turning back to FIG. 9, the user may partially expand the address bar 108 while partially closing the standard toolbar 120 by dragging the section to the right. At this point, when the user releases the mouse button, the address bar 108 and the standard toolbar 120 are both partially expanded.

Figure 10:
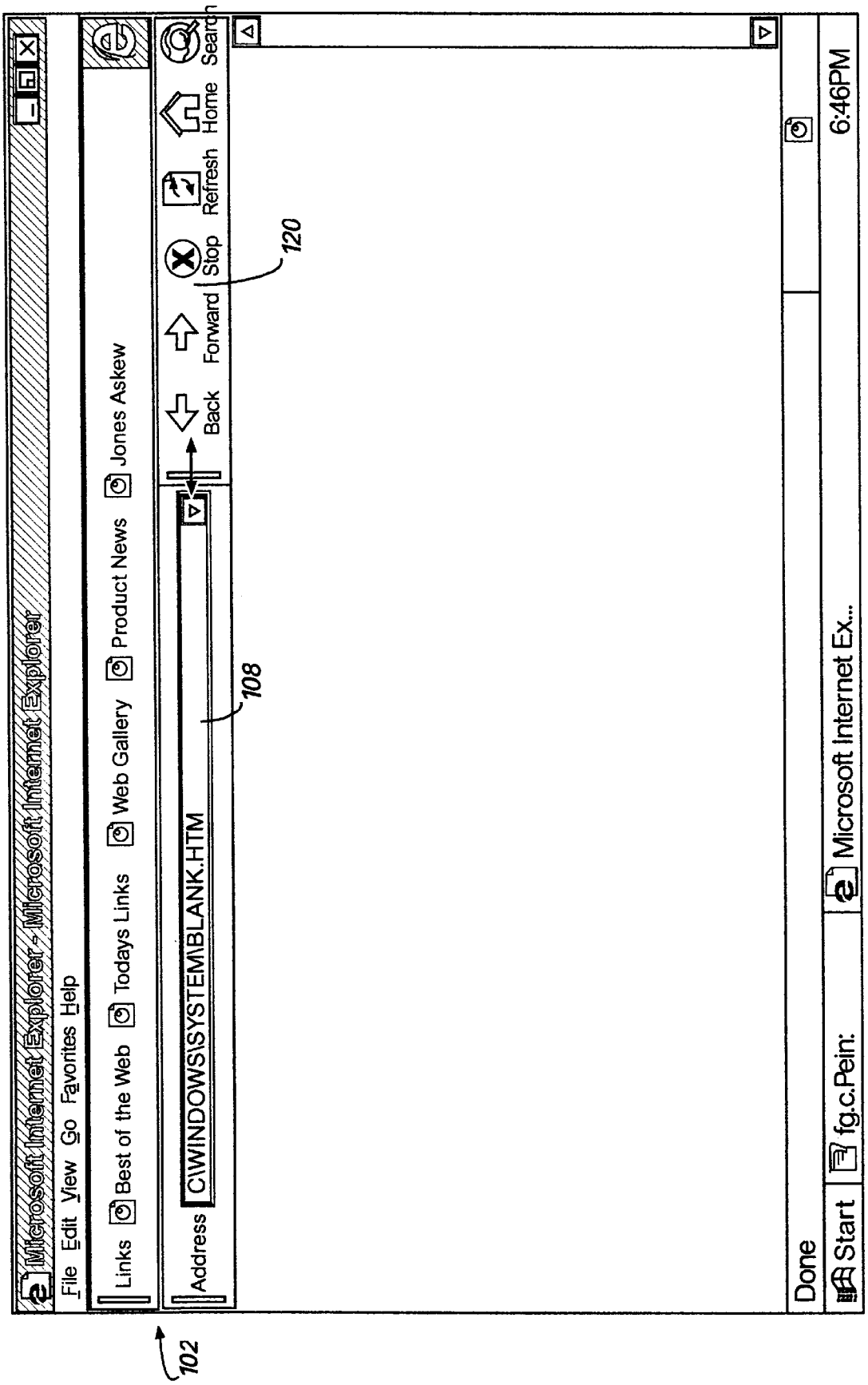
FIG. 10 is a screen display illustrating a composite toolbar having a more expanded address bar and a less expanded standard toolbar in accordance with the exemplary embodiment of the present invention.

However, if the user continues to drag the toolbar 120 to the right, more of the address bar 108 is shown and less of a standard toolbar 120 is shown in the application window 200, as depicted in FIG. 10.

If the user continues to drag the standard toolbar 120 further to the right, eventually the address bar 108 will be fully expanded and the standard toolbar 120 will be fully collapsed, as reflected in FIG. 8.

The rearrangement aspect of the customization feature makes it easier for the user to directly arrange sections on the composite toolbar in the application window. In sum, the web browser application program 37 allows the user to shift sections from one row to another row, as well as rearrange sections within a row. The web browser application program 37 is also designed so that the logo area remains permanently positioned throughout the resizability and rearrangement exercises.

With continuous reference to FIGS. 1–10 and now turning to FIGS. 11–13, the process of customizing a composite toolbar will be described through the use of state diagrams.

Figure 11:
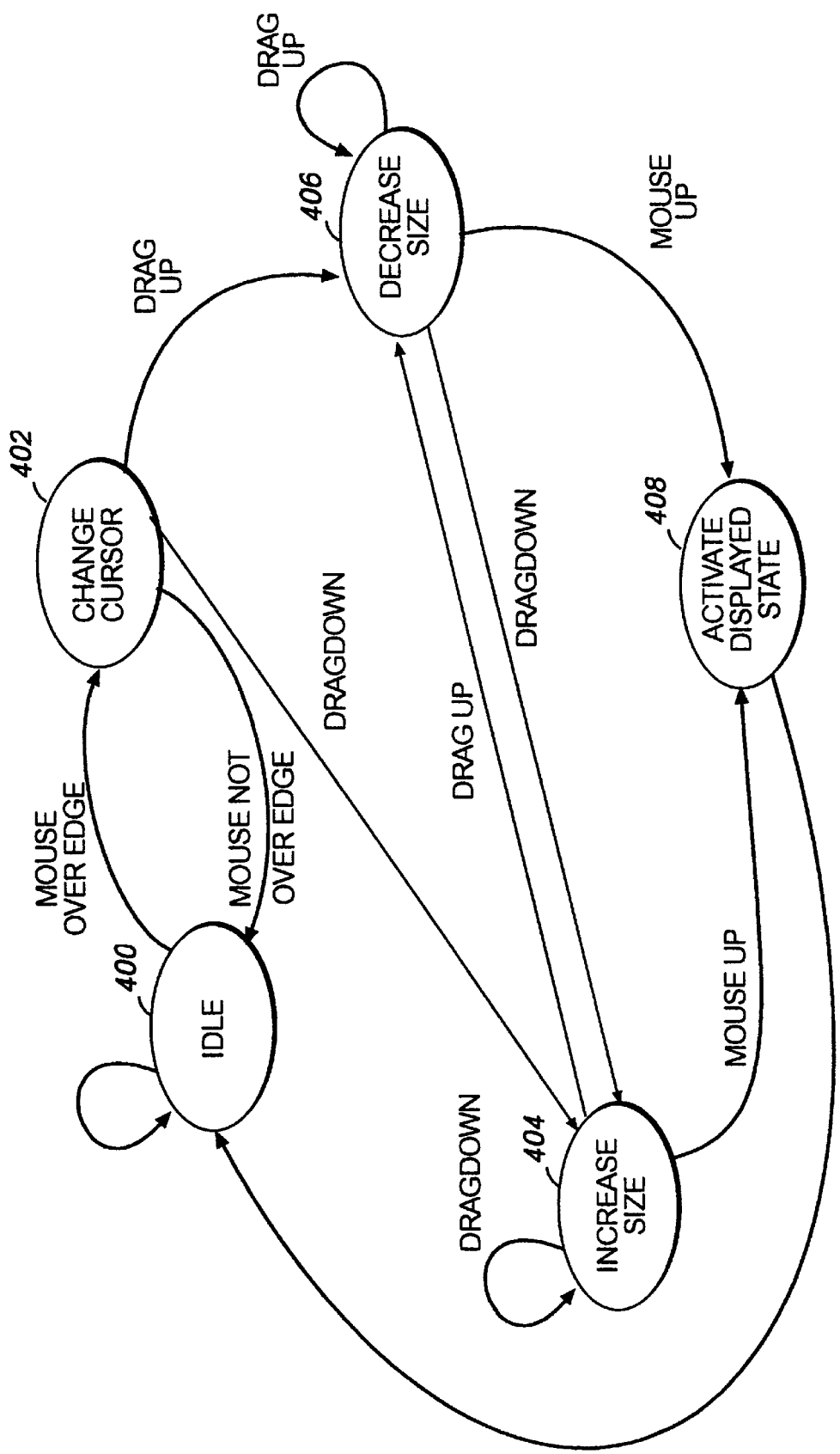
FIG. 11 is a state diagram illustrating a method for resizing a composite toolbar in response to user-provided input in accordance with the exemplary embodiment of the present invention.

Referring to FIG. 11, a method by which a computer resizes a composite toolbar will be described. FIG. 11 is a state diagram that illustrates an exemplary method for resizing a composite toolbar by direct manipulation of the composite toolbar. Those skilled in the art will appreciate that the process described by the state diagram of FIG. 11 is executed by the processing unit 21 (FIG. 1) in response to instructions that have been incorporated into various program modules, including the operating system, web browser, etc.

Those skilled in the art will also understand that the operating system and browser program modules employ a variety of techniques that facilitate communications between the computer hardware and various program modules. For example, the composite toolbar has an object identifier that is used to identify the element. These features allow data to be passed back and forth between various processes and facilitates interaction with the user via the mouse and other input devices.

The method starts in an initial IDLE state 400. A time interval elapses between each change of state, and the changes are dependent upon the current input event.

In the IDLE state 400, the exemplary application program 37 (FIG. 1) is running, a composite toolbar is displayed on the display area of the display screen, and a user may be performing any one of a number of activities, such as browsing a web page, performing a search, and the like. However, the program is idle in the sense that no action is taken with respect to resizing the composite toolbar if no user input occurs.

If the user moves the mouse so that the cursor is positioned over the bottom edge of the composite toolbar, the state changes to a CHANGE CURSOR state 402. In state 402, the appearance of the cursor changes to a vertical double-headed arrow, which indicates that it is within a resize area. At this point, the user can move the mouse so that the cursor is no longer positioned over the bottom edge of the composite toolbar, thereby returning to the IDLE state 400, or the user can leave the cursor in the resize area so that the state machine remains in the CHANGE CURSOR state 402.

Figure 3:
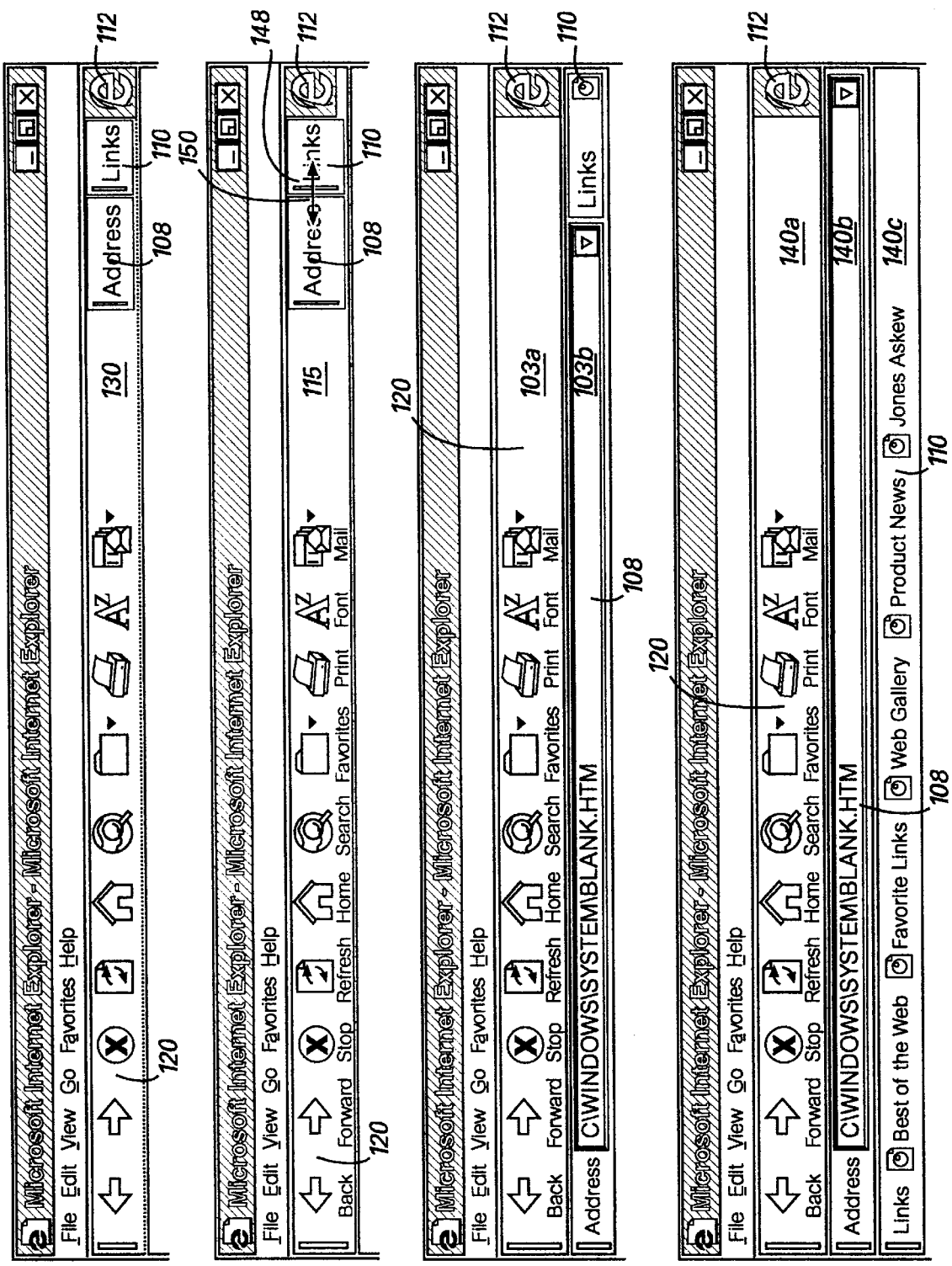
FIG. 3, consisting of FIGS. 3(a)–3(d), includes screen displays illustrating a composite toolbar in various configuration states in accordance with the exemplary embodiment of the present invention.

If the user chooses the latter, the user has the option of either dragging the bottom edge of the composite toolbar up or down by pressing and holding the mouse. If the user drags the composite toolbar in a downward direction, the state changes to an INCREASE SIZE state 404, in which case, the composite toolbar is expanded. If the user drags the composite toolbar in an upward direction, the state changes to a DECREASE SIZE state 406, in which case, the composite toolbar is compressed. Exemplary configuration states are illustrated in FIGS. 3(*a*)–(*d*).

In state 404, if the user continues to drag the composite toolbar in the downward direction, the composite toolbar will continue to expand until it reaches its largest expanded configuration state. However, if the user decides to drag the composite toolbar in the upward direction while in the INCREASE SIZE state 404, the state changes to a DECREASE SIZE state 406.

On the other hand, in state 406, if the user continues to drag the composite toolbar in the upward direction, the composite toolbar will continue to compress until it reaches its smallest compressed configuration state. However, if the user decides to drag the composite toolbar in the downward direction while in the DECREASE SIZE state 406, the state changes to the INCREASE SIZE state 404.

Once the user has chosen the desired configuration state, the user can then release the mouse button, thereby changing the state to an ACTIVATE DISPLAYED state 408.

The desired configuration state becomes active, and the state returns to the IDLE state 400.

Figure 12:
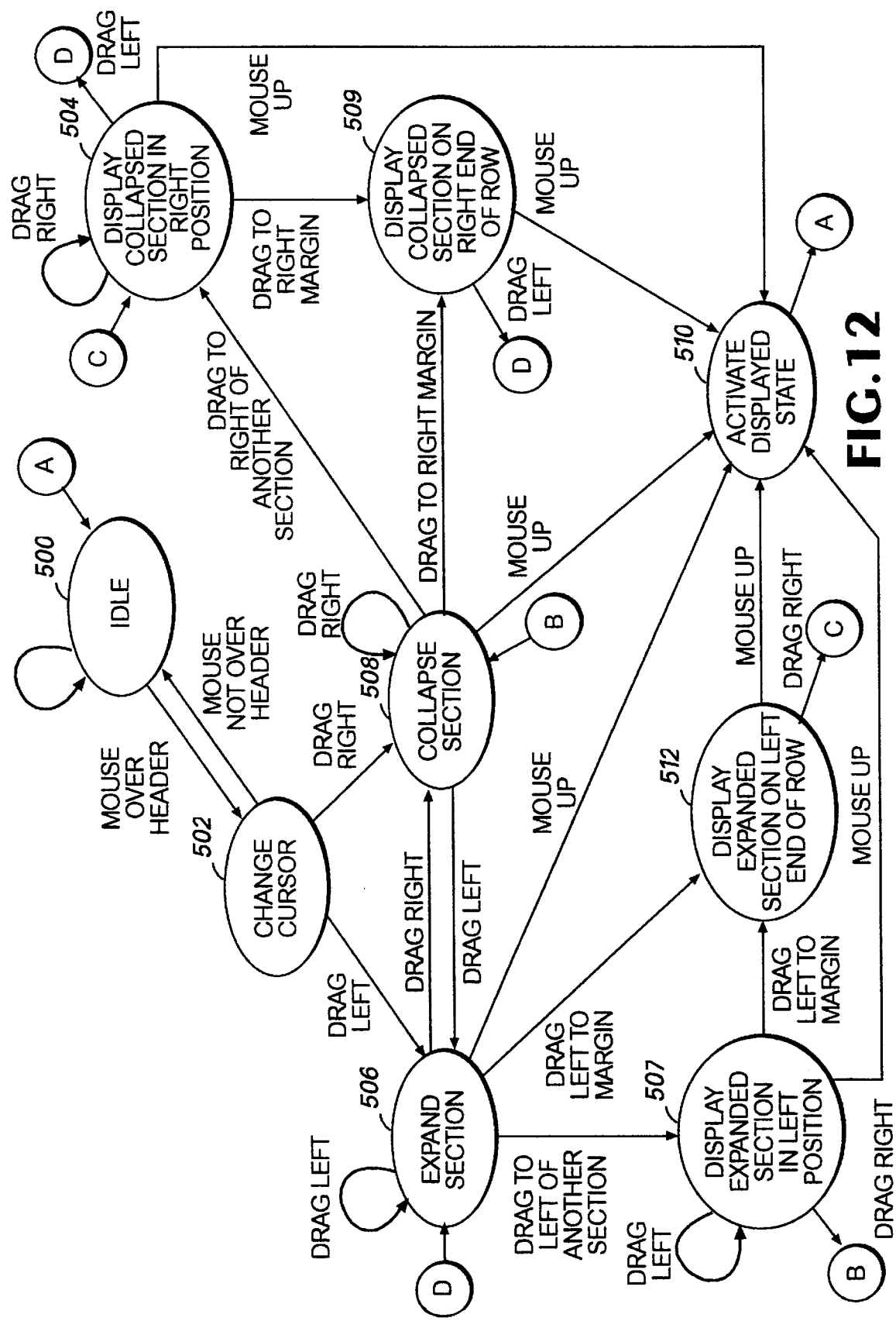
FIG. 12 is a state diagram illustrating a method for rearranging a section within the same row of a composite toolbar in accordance with the exemplary embodiment of the present invention.

FIG. 12 is a state diagram illustrating an exemplary method for rearranging a section within the same row of a composite toolbar. The method starts in an initial IDLE state 500. A time interval elapses between each change of state, and the changes are dependent upon the current input event.

In the IDLE state 500, the exemplary application program 37 (FIG. 1) is running, a composite toolbar is displayed on the display area of the display screen, and a user may be performing any one of a number of activities, such as browsing a web page, performing a search, and the like. However, no action is taken with respect to rearranging a section within the same row of the composite toolbar if no user input occurs.

If the user moves the mouse so that the cursor is positioned over a header of a section within the composite toolbar, the state changes to a CHANGE CURSOR state 502. In state 502, the appearance of the cursor changes to indicate that it is within a rearrange area. If the cursor is positioned over the double-lined raised edge of the section, then the appearance of the cursor changes to a horizontal double-headed arrow. However, if the cursor is positioned over the section caption, then the cursor changes to a hand.

At this point, the user can move the mouse so that the cursor is no longer positioned over the header, thereby returning to the IDLE state 500, or the user can leave the cursor in the rearrange area so that the state remains in the CHANGE CURSOR state 502.

If the user chooses the latter, the user has the option of either dragging the section left or right by pressing and holding the mouse. Assuming the section is already in a collapsed view or a partially expanded view, if the user drags the section to the left, the state changes to an EXPAND SECTION state 506, in which case, the section begins to expand. However, assuming the section is in an expanded view or partially expanded view, if the user drags the section to the right, the state changes to a COLLAPSE SECTION state 508, in which case, the section begins to collapse.

In state 506, if the user continues to drag the section to the left, the section will continue to expand until it is fully expanded. However, once the section is fully expanded, if the user continues to drag the expanded section to the left, the state changes to either a DISPLAY EXPANDED SECTION IN LEFT POSITION state 507, in which case, the expanded section is positioned to the immediate left of the section that was on its left, or a DISPLAY EXPANDED SECTION ON LEFT END OF ROW state 512, in which case, the expanded section is positioned on the far left end of the row. State 506 changes to state 507 when there is more than one section located to the left of the expanded section. Section 506 changes to state 512 when there is only one section located to the left of the expanded section.

In state 507, if the user continues to drag the expanded section to the left, the expanded section will continue to move to the left of any sections that are located to its immediate left until the expanded section is displayed on the far left end of the row. Resultingly, state 507 changes to state 512. However, if the user decides to drag the expanded section to the right while in state 507, the state changes to the COLLAPSE SECTION state 508.

In the DISPLAY EXPANDED SECTION ON LEFT END OF ROW state 512, if the user decides to drag the section to the right and collapse it, the state eventually changes to a DISPLAY COLLAPSED SECTION IN RIGHT POSITION state 504. As a result, the expanded section moves to the immediate right of the section on its right, and the expanded section immediately collapses.

In state 508, if the user continues to drag the section to the right, the section will continue to collapse until it is fully collapsed. However, once the section is fully collapsed, if the user continues to drag the collapsed section to the right, the state changes to either a DISPLAY COLLAPSED SECTION ON RIGHT END OF ROW state 509, in which case, the collapsed section is positioned on the far right end of the row, or the DISPLAY COLLAPSED SECTION IN RIGHT POSITION state 504. State 508 changes to state 509 when there only one section located to the right of the collapsed section. State 508 changes to state 504 when there is more than one section located to the left of the collapsed section.

In state 504, if the user continues to drag the collapsed section to the right, the collapsed section will continue to move to the right of any other sections located to its immediate right until the collapsed section is displayed on the far right end of the row. Resultingly, state 504 changes to state 509. However, if the user decides to drag the collapsed section to the left while in state 504, the state changes to the EXPAND SECTION state 506.

In the DISPLAY COLLAPSED SECTION ON RIGHT END OF ROW state 509, if the user decides to drag the section to the left, the state changes to the EXPAND SECTION state 506.

Once the user has completed expanding or collapsing the section, the user can then release the mouse button, thereby changing the state to the ACTIVATE DISPLAYED STATE state 510. The desired configuration state becomes active, and the state returns to the IDLE state 500.

Figure 13:
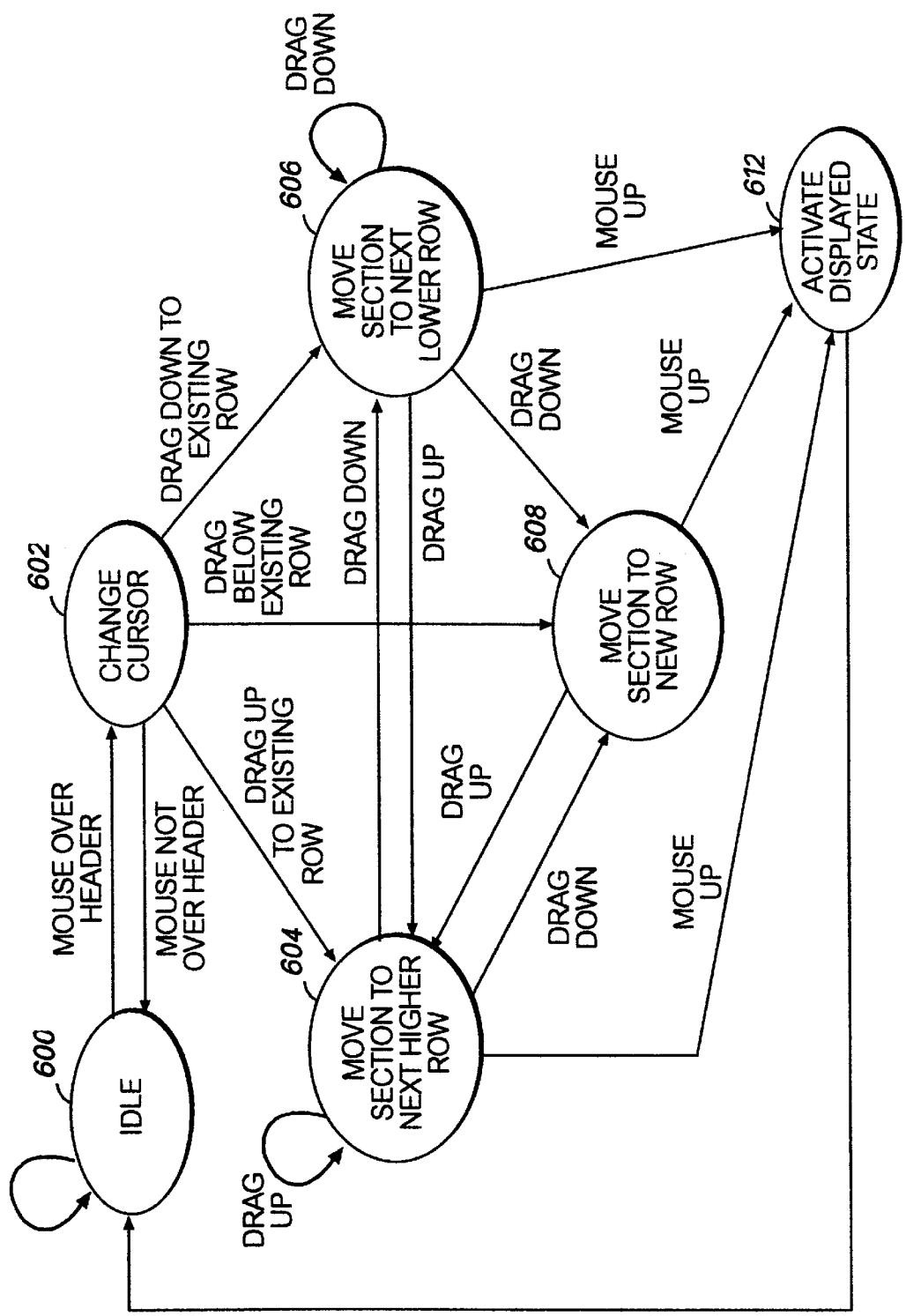
FIG. 13 is a state diagram illustrating a method for rearranging sections by moving a selected section from one row to another row in response to user-provided input in accordance with the exemplary embodiment of the present invention.

Referring to FIG. 13, a state diagram illustrating the states for rearranging sections by moving a selected section from one row to another row in response to user-provided input will now be described in accordance with the exemplary embodiment of the present invention. The method starts in an initial IDLE state 600. A time interval elapses between each change of state, and the changes are dependent upon the current input event.

In the IDLE state 600, the exemplary application program 37 (FIG. 1) is running, a composite toolbar is displayed on the display area of the display screen, and a user may be performing any one of a number of activities, such as browsing a web page, performing a search, and the like. However, no action is taken with respect to rearranging a section within the same row of the composite toolbar if no user input occurs.

If the user moves the mouse so that the cursor is positioned over a header of a section within the composite toolbar, the state changes to a CHANGE CURSOR state 602. In state 602, the appearance of the cursor changes to a horizontal double-headed arrow, which indicates that it is within a rearrange area. At this point, the user can move the mouse so that the cursor is no longer positioned over the header of the section, thereby returning to the IDLE state 600, or the user can leave the cursor in the rearrange area so that the state machine remains in the CHANGE CURSOR state 602.

If the user chooses the later, the user has the option of either dragging the section up or down to an existing row or down to a new row by pressing and holding the mouse. If the user drags the section up to an existing row, the state changes to a MOVE SECTION TO NEXT HIGHER ROW state 604, in which case, the section is moved to the next higher row. If the user drags the section down to an existing row, the state changes to a MOVE SECTION TO NEXT LOWER ROW state 606, in which case, the section is moved to the next lower row. If the user drags the section below the last existing row (assuming the composite toolbar is not already in its large configuration state), the state changes to a MOVE SECTION TO NEW ROW state 608, in which case, a new row is created containing the moved section. While in state 606 or state 608, if the user drags the section up, the state changes to state 604.

In state 604, if the user continues to drag the section up, the section will continue to move to the next higher row until it reaches the highest row in the composite toolbar. When the section is moved to the next higher row, and there are no more sections remaining on the previously occupied row, the empty row is eliminated.

If the user decides to drag the section down while in state 604, the state changes to either state 606 or state 608 depending on whether a next lower row already exists or a new row has to be created, respectively.

In state 606, if the user continues to drag the section down, the section will continue to move to the next lower row in the composite toolbar. If the user drags the section below the last existing row (assuming the composite toolbar is not already in its large configuration state), the state changes to the MOVE SECTION TO NEW ROW state 608.

Once the user has chosen moved the section to the desired row, the user can then release the mouse button, thereby changing the state to an ACTIVATE DISPLAYED STATE state 612. The desired configuration state becomes active, and the state returns to the IDLE state 600.

CONCLUSION

From the foregoing description, it will be appreciated that the present invention supports direct on-screen manipulation of a composite toolbar having multiple sections. Specifically, the present invention allows a user to resize the composite toolbar and rearrange sections within the composite toolbar based on the user's preference. As a result, the user controls the amount of display area the composite toolbar occupies, as well as the presentation of the composite toolbar.

The invention may conveniently be implemented in one or more program modules that are based upon the state diagrams of FIGS. 11–13, and the features illustrated in FIGS. 2–10. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the present invention was described in the context of a web browser, which displayed a standard toolbar, an address bar, and a links bar, those skilled in the art will appreciate that the present invention is applicable not only to web browsers, but also to other types of GUI features and program modules. Similarly, the present invention may be applied regardless of whether the GUI elements and controls are implemented in program modules associated with an operating system or application program.

Although the present invention was described having a toolbar horizontally orientated at the top of and physically attached to an application window, those skilled in the art will appreciate that the present invention is not limited to this arrangement, but may include a toolbar that can be positioned anywhere in the application window. Furthermore, the toolbar can be vertically orientated, floating, or any combination thereof.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system including a display device and an input device and employing a graphical user interface (GUI), a method for rearranging a composite toolbar, comprising the steps of:

(a) displaying a composite toolbar in an initial configuration state, the composite toolbar having a plurality of sections displayed on a number n rows;

(b) receiving from the input device an indication that one of the sections has been moved in a first direction;

(c) in response to one of the sections being moved in a first direction, expanding the moved section so that it overlaps an adjacent section;

(d) receiving from the input device an indication that one of the sections has been moved in a second direction;

(e) in response to one of the sections being moved in a second direction, collapsing the section so that it reveals an adjacent section;

(f) receiving from the input device an indication that one of the sections has been moved in a third direction;

(g) in response to one of the sections being moved in a third direction, moving the section to a new row and displaying it in an expanded state;

(h) receiving from the input device an indication that one of the sections has been moved in a fourth direction; and (i) in response to one of the sections being moved in a fourth direction, moving the section to an existing adjacent row, displaying the section in an expanded state, and displaying the section previously on the existing adjacent row in a compressed state.

2. The method of claim 1, further comprising the steps of:

receiving from the input device an indication that one of the sections has been moved in the first or second direction past an adjacent section; and in response to one of the sections being moved in the first or second direction past the adjacent section, repositioning the section so that it is positioned to the opposite side of the adjacent section.

3. The method of claim 1, further comprising the steps of:

in response to moving the section to the existing adjacent row, determining whether one of the n rows is empty; and in response to one of the n rows being empty, deleting the empty row so that the composite toolbar has n−1 rows, and the plurality of sections are arranged on the n−1 rows.

4. The method of claim 1, further comprising the steps of:

receiving from the input device an indication that the a pointer has been positioned over one of the sections; and in response to the pointer being positioned over one of the sections, changing the pointer to a predetermined icon indicating that the section can be moved.

5. The method of claim 1, wherein moving the section to a new row results in the composite toolbar having n+1 rows, and the plurality of sections are arranged on the n+1 rows.

6. The method of claim 1, further comprising the steps of:

receiving from the input device an indication that one of the sections has been selected; and in response to one of the sections being selected, displaying the selected section in an expanded state if it is in a compressed state, and displaying the adjacent section in a compressed state.

7. A computer system for rearranging a composite toolbar, comprising:

a processing unit;

an input device connected to the processing unit;

a memory storage device for storing a program module; and a display device, coupled to the processing unit, for displaying the composite toolbar;

the processing unit, responsive to instructions from the program module running on the computer system, being operative to:

(a) display a composite toolbar in an initial configuration state, the composite toolbar having a plurality of sections displayed on a number n rows;

(b) receive from the input device an indication that one of the sections has been moved in a first direction;

(c) in response to one of the sections being moved in a first direction, expand the moved section so that it overlaps an adjacent section;

(d) receive from the input device an indication that one of the sections has been moved in a second direction;

(e) in response to one of the sections being moved in a second direction, collapse the moved section so that it reveals the adjacent section;

(f) receive from the input device an indication that one of the sections has been moved in a third direction;

(g) in response to one of the sections being moved in a third direction, move the section to a new row and displaying it in an expanded state;

(h) receive from the input device an indication that one of the sections has been moved in a fourth direction; and (i) in Response to one of the sections being moved in a fourth direction, move the section to an existing adjacent row, display the section in an expanded state, and display the section previously on the existing adjacent row in a compressed state.

8. The computer system of claim 7, being further operative to:

receive from the input device an indication that one of the sections has been moved in the first or second direction past an adjacent section; and in response to one of the sections being moved in the first or second direction past the adjacent section, reposition the moved section so that it is positioned to the opposite side of the adjacent section.

9. The computer system of claim 7, wherein one of the plurality of sections is a stationary section that is displayed in a predetermined position on one of the rows regardless of the number of rows in the configuration state.

10. The computer system of claim 7, being further operative to:

in response to moving the section to an existing adjacent row, determine whether one of the n rows is empty; and in response to one of the n rows being empty, delete the empty row so that the composite toolbar has n−1 rows, and the plurality of sections are arranged on the n−1 rows.

11. The computer system of claim 7, being further operative to:

receive from the input device an indication that the a pointer has been positioned over one of the sections; and in response to the pointer being positioned over one of the sections, change the pointer to a predetermined icon indicating that the section can be moved.

12. The computer system of claim 7, wherein moving the section to a new row results in the composite toolbar having n+1 rows, and the plurality of sections are arranged on the n+1 rows.

13. The computer system of claim 7, being further operative to:

receive from the input device an indication that one of the sections has been selected;

in response to one of the sections being selected, display the selected section in the expanded state if it is in the compressed state, and display the adjacent section in the compressed state.

14. A computer-readable medium on which is stored a program module for rearranging a composite toolbar, the program module comprising instructions which, when executed by a computer, perform the steps of:

(a) displaying a composite toolbar in an initial configuration state, the composite toolbar having a plurality of sections displayed on a number n rows;

(b) receiving an indication that the a pointer has been positioned over one of the sections;

(c) in response to the pointer being positioned over one of the sections, changing the pointer to a predetermined icon indicating that the section can be moved;

(d) receiving an indication that one of the sections has been moved in a first direction;

(e) in response to one of the sections being moved in a first direction, expanding the moved section so that it overlaps an adjacent section;

(f) receiving an indication that one of the sections has been moved in a second direction;

(g) in response to one of the sections being moved in a second direction, collapsing the moved section so that it reveals an adjacent section;

(h) receiving an indication that one of the sections has been moved in a third direction;

(i) in response to one of the sections being moved in a third direction, moving the section to a new row and displaying it in an expanded state;

(j) receiving an indication that one of the sections has been moved in a fourth direction;

(k) in response to one of the sections being moved in a fourth direction, moving the section to an existing adjacent row, displaying the section in an expanded state, and displaying the section previously on the existing adjacent row in a compressed state;

(l) in response to moving the section to an existing adjacent row, determining whether one of the n rows is empty; and (m) in response to one of the n rows being empty, deleting the empty row.

15. The computer-readable medium of claim 14, further performing the steps of:

receiving an indication that one of the sections has been moved in the first or second direction past an adjacent section; and in response to one of the sections being moved in the first or second direction past the adjacent section, repositioning the section so that it is positioned to the opposite side of the adjacent section.

16. The computer-readable medium of claim 14, wherein one of the plurality of sections is a stationary section that is displayed in a predetermined position on one of the rows regardless of the number of rows in the configuration state.

17. The computer-readable medium of claim 14, wherein deleting the empty row results in the composite toolbar having n−1 rows, and the plurality of sections are arranged on the n−1 rows.

18. The computer-readable medium of claim 14, wherein moving the section to a new row results in the composite toolbar having n+1 rows, and the plurality of sections are arranged on the n+1 rows.

19. The computer-readable medium of claim 14, further performing the steps of:

receiving from the input device an indication that one of the sections has been selected;

in response to one of the sections being selected, displaying the selected section in the expanded state if it is in the compressed state, and displaying the adjacent section in the compressed state.

20. In a computer system including a display device and an input device and employing a graphical user interface (GUI), a method for rearranging a composite toolbar having a height and a width, comprising the steps of:

displaying a composite toolbar in an initial configuration state, the composite toolbar having a rearranging area and a plurality of sections displayed on a number n rows;

receiving from the input device an indication that the rearranging area has been moved in a first or second direction;

in response to the rearranging area being moved in the first direction, increasing the height of the composite toolbar by changing to a larger configuration state having n+1 rows, while holding the width of the composite toolbar constant, regardless of the size of any of the sections;

in response to the rearranging area being moved in the second direction, decreasing the height of the composite toolbar by changing to a smaller configuration state having n−1 rows, while holding the width of the composite toolbar constant, regardless of the size of any of the sections;

receiving from the input device an indication that a section has been moved in a first, second, third, or fourth direction;

in response to a section being moved in the first direction, moving the section to a new row and displaying it in an expanded state;

in response to a section being moved in the second direction, moving the section to an existing adjacent row, displaying the section in an expanded state, and displaying the section previously on the existing adjacent row in a compressed state;

in response to a section being moved in the third direction, expanding the section so that it overlaps an adjacent section; and in response to a section being moved in the fourth direction, collapsing the section so that it reveals an adjacent section.

21. The method of claim 20, further comprising the steps of:

receiving from the input device an indication that one of the sections has been moved in the third or fourth direction past the adjacent section; and in response to one of the sections being moved in the third or fourth direction past the adjacent section, repositioning the moved section so that it is positioned to the opposite side of the adjacent section.

22. The method of claim 20, wherein, in the larger configuration state, the plurality of sections are arranged on the n+1 rows.

23. The method of claim 20, wherein, in the smaller configuration state, the plurality of sections are arranged on the n−1 rows.

24. The method of claim 20, further comprising the steps of:

in response to moving the section to an existing adjacent row, determining whether one of the n rows is empty; and in response to one of the n rows being empty, deleting the empty row so that the composite toolbar has n−1 rows, and the plurality of sections are arranged on the n−1 rows.

25. The method of claim 20, wherein moving the section to a new row results in the composite toolbar having n+1 rows, and the plurality of sections are arranged on the n+1 rows.

26. The method of claim 20, further comprising the steps of:

receiving from the input device an indication that one of the sections has been selected;

in response to one of the sections being selected, displaying the selected section in the expanded state if it is in the compressed state, and displaying the adjacent section in the compressed state.

* * * * *